United States Patent
Fu et al.

(10) Patent No.: US 9,246,603 B2
(45) Date of Patent: Jan. 26, 2016

(54) METHOD OF IN-DEVICE INTERFERENCE MITIGATION FOR CELLULAR, BLUETOOTH, WIFI, AND SATELLITE SYSTEMS COEXISTENCE

(75) Inventors: I-Kang Fu, Taipei (TW); Willaim Plumb, Charlestown, MA (US)

(73) Assignee: MEDIATEK INC. (TW)

( * ) Notice: Subject to any disclaimer, the term of this patent is extended or adjusted under 35 U.S.C. 154(b) by 851 days.

(21) Appl. No.: 13/136,861

(22) Filed: Aug. 11, 2011

(65) Prior Publication Data
US 2012/0040715 A1 Feb. 16, 2012

Related U.S. Application Data (60) Provisional application No. 61/373,142, filed on Aug. 12, 2010, provisional application No. 61/373,151, filed on Aug. 12, 2010, provisional application No. 61/374,046, filed on Aug. 16, 2010, provisional application No. 61/374,052, filed on Aug. 16, 2010.

(51) Int. Cl.
*H04M 1/00* (2006.01)
*H04B 15/00* (2006.01)
(Continued)

(52) U.S. Cl.
CPC .............. *H04B 15/00* (2013.01); *H04B 1/1027* (2013.01); *H04B 1/406* (2013.01); *H04B 1/525* (2013.01); *H04W 52/244* (2013.01)

(58) Field of Classification Search
CPC .................................................... H04W 88/06
USPC ...................................................... 455/553.1
See application file for complete search history.

(56) References Cited

U.S. PATENT DOCUMENTS

| 7,809,012 B2 | 10/2010 | Ruuska et al. ................ 370/449 |
| 2004/0224719 A1* | 11/2004 | Nounin et al. ............. 455/553.1 |

(Continued)

FOREIGN PATENT DOCUMENTS

| CN | 1731692 A | 2/2006 |
| CN | 101132368 A | 2/2008 |

(Continued)

OTHER PUBLICATIONS

International Search Report and Written Opinion of International Search Authority for PCT/CN2011/075963 dated Sep. 8, 2011 (11 pages).

(Continued)

*Primary Examiner* — Huy C Ho
(74) *Attorney, Agent, or Firm* — Imperium Patent Works; Zheng Jin (57) ABSTRACT

A coexistence interference mitigation method is provided. In a wireless network, a wireless device is equipped with multiple radios in the same device platform. The wireless device also has a control entity that communicates with the multiple co-located radio modules. A first radio module receives a notification from the control entity. The notification informs a critical signaling status of a second radio module co-located with the first radio module. Upon receiving the notification, the first radio module stops uplink transmission due to coexistence interference and transmits a coexistence indicator to its serving eNB. After a certain period, the first radio module receives a second notification that informs a completion status of the critical signaling of the second radio module. Upon receiving the second notification, the first radio module resumes uplink transmission and transmits a coexistence resume indicator to the eNB.

21 Claims, 6 Drawing Sheets

(51) Int. Cl.
  *H04B 1/10* (2006.01)
  *H04B 1/403* (2015.01)
  *H04B 1/525* (2015.01)
  *H04W 52/24* (2009.01)

(56) References Cited

U.S. PATENT DOCUMENTS

| | | | |
|---|---|---|---|
| 2005/0059347 A1 | 3/2005 | Haartsen | 455/41.2 |
| 2006/0217071 A1 | 9/2006 | Russo et al. | 455/66.1 |
| 2007/0021066 A1 | 1/2007 | Dravida et al. | 455/41.2 |
| 2007/0165754 A1 | 7/2007 | Kiukkonen et al. | 375/346 |
| 2007/0263709 A1 | 11/2007 | Kasslin et al. | 375/222 |
| 2008/0043705 A1 | 2/2008 | Desai et al. | 370/346 |
| 2008/0075059 A1 | 3/2008 | Kermoal et al. | 370/343 |
| 2008/0080555 A1 | 4/2008 | Carter et al. | 370/470 |
| 2008/0200195 A1 | 8/2008 | Abe et al. | 455/501 |
| 2008/0253352 A1 | 10/2008 | Thoukydides et al. | 370/345 |
| 2009/0017756 A1* | 1/2009 | Tsfaty et al. | 455/41.2 |
| 2009/0028115 A1 | 1/2009 | Hirsch | 370/337 |
| 2009/0040937 A1 | 2/2009 | Xhafa et al. | 370/252 |
| 2009/0054009 A1 | 2/2009 | Yang et al. | 455/78 |
| 2009/0081962 A1 | 3/2009 | Sohrabi | 455/79 |
| 2009/0088177 A1 | 4/2009 | Yang et al. | 455/452.2 |
| 2009/0168716 A1 | 7/2009 | Moon et al. | 370/329 |
| 2009/0225717 A1 | 9/2009 | Banerjea | 370/329 |
| 2009/0247218 A1 | 10/2009 | Lee et al. | 455/553.1 |
| 2009/0252122 A1 | 10/2009 | Leinonen et al. | 370/332 |
| 2009/0257208 A1 | 10/2009 | Filipovic et al. | 361/760 |
| 2009/0262785 A1 | 10/2009 | Wilhelmsson | 375/133 |
| 2009/0298440 A1 | 12/2009 | Takeya et al. | 455/67.14 |
| 2009/0322596 A1 | 12/2009 | Rowitch et al. | 342/357.1 |
| 2010/0008336 A1 | 1/2010 | Keidar et al. | 370/338 |
| 2010/0027525 A1 | 2/2010 | Zhu | 370/350 |
| 2010/0046498 A1 | 2/2010 | Hall | 370/350 |
| 2010/0054207 A1 | 3/2010 | Gupta et al. | 370/331 |
| 2010/0061326 A1 | 3/2010 | Lee et al. | 370/329 |
| 2010/0098135 A1 | 4/2010 | Eitan | 375/141 |
| 2010/0137025 A1 | 6/2010 | Tal et al. | 455/553.1 |
| 2010/0191613 A1 | 7/2010 | Raleigh | 705/26 |
| 2010/0197235 A1 | 8/2010 | Wilhelmsson | 455/63.3 |
| 2010/0227639 A1 | 9/2010 | Kim et al. | 455/525 |
| 2011/0136497 A1 | 6/2011 | Youtz et al. | 455/452.2 |
| 2011/0149920 A1 | 6/2011 | Liu et al. | 370/336 |
| 2011/0235612 A1 | 9/2011 | Abeta et al. | 370/329 |
| 2011/0235621 A1 | 9/2011 | Ko et al. | 370/338 |
| 2011/0243047 A1 | 10/2011 | Dayal et al. | 370/311 |
| 2011/0256834 A1 | 10/2011 | Dayal et al. | 455/67.7 |
| 2012/0020229 A1 | 1/2012 | Dayal et al. | 370/252 |
| 2012/0113884 A1 | 5/2012 | Park et al. | 370/312 |
| 2012/0218964 A1 | 8/2012 | Park et al. | 370/329 |
| 2012/0230252 A1 | 9/2012 | Yang | 370/328 |
| 2012/0269172 A1 | 10/2012 | Chin et al. | 370/332 |

FOREIGN PATENT DOCUMENTS

| | | |
|---|---|---|
| CN | 101141155 A | 3/2008 |
| CN | 101361279 A | 2/2009 |
| CN | 101365249 A | 2/2009 |
| CN | 101431808 A | 5/2009 |
| CN | 101553054 A | 10/2009 |
| CN | 101640565 A | 2/2010 |
| CN | 101677290 A | 3/2010 |
| CN | 101742526 A | 6/2010 |
| CN | 101848058 A | 9/2010 |
| EP | 2107839 | 10/2009 |
| JP | 2001128237 | 5/2001 |
| JP | 2006279943 | 10/2006 |
| JP | 2008235978 | 10/2008 |
| JP | 2009500988 | 1/2009 |
| JP | 200965307 | 3/2009 |
| JP | 2009512244 | 3/2009 |
| JP | 2010038348 | 2/2010 |
| WO | WO2005020518 A1 | 3/2005 |
| WO | WO2005117473 | 12/2005 |
| WO | WO2007036686 | 4/2007 |
| WO | WO2007143352 | 12/2007 |
| WO | WO2008078311 | 7/2008 |
| WO | WO2009127690 | 10/2009 |
| WO | WO2010002219 A2 | 1/2010 |
| WO | WO2010025678 | 3/2010 |
| WO | WO2010027208 A2 | 3/2010 |
| WO | WO2010054364 A1 | 5/2010 |
| WO | WO2010073325 | 7/2010 |

OTHER PUBLICATIONS

International Search Report and Written Opinion of International Search Authority for PCT/CN2011/078368 dated Nov. 3, 2011 (13 pages).
MediaTek et al., Discussion on In-device Coexistence Interference Avoidance, 3GPP TSG-RAN WG2 Meeting #70bis[online], Jun. 22, 2010. Retrieved from the Internet:<http://www.3gpp.org/ftp/tsg_ran/WG2_RL2/TSGR2_70bis/Docs/>.
JP Office Action for JP applicant 2013-514543 dated Jan. 28, 2014 (7 pages).
JP Office Action for JP applicant 2013-534155 dated Feb. 4, 2014 (2 pages).
JP Office Action for JP applicant 2013-523483 dated Feb. 18, 2014 (4 pages).
JP Office Action for JP applicant 2013-530554 dated Mar. 14, 2014 (4 pages).
The EPO has prepared the Search Report for the EP patent application 11833858 dated Apr. 24, 2013 (13 pages).
The SIPO has prepared the Examination Opinion for the Chinese patent application 201180003269.X dated Jun. 3, 2013 (11 pages).
The SIPO has prepared the Examination Opinion for the Chinese patent application 201180002307.X dated Jun. 21, 2013 (9 pages).
The USPTO has prepared the Office Action of related U.S. Appl. No. 13/134,876 dated Jun. 13, 2013 (26 pages).
The USPTO has prepared the Office Action of related U.S. Appl. No. 13/136,862 dated Jun. 24, 2013 (33 pages).
3GPP R2-106004 TR 36.816 Vo.2.0, 3rd Generation Partnership Project; Technical Specification Group Radio Access Networks; Evolved Universal Terrestrial Radio Access (E-UTRA); Study on Signaling and Procedure foe Interference Avoidance for In-Device Coexistence; Release 10 (12 pages).
3GPP TSG-RAN WG2#71bis R2-105712, Motorola; Solution Directions for LTE-ISM Coexistence; Xi'An, China, Oct. 11-15, 2010 (6 pages).
3GPP TSG-RAN WG2 Meeting#71bis R2-105587, Huawei HiSilicon; Consideration on the Details of In-Device Interference; Xi'An, China, Oct. 11-15, 2010 (4 pages).
3GPP Tsg Ran WG2 Meeting#71bis R2-105336, CATT; FDM-based Approach for In- Device Coexistence Interference; Xi'An, China, Oct. 11-15, 2010 (2 pages).
3GPP TSG-RAN WG2 Meeting#71bis R2-105673, CMCC; Discussion on Moving LTE Signal Away from ISM Band for In-Device Coexistence; Xi'An, China, Oct. 11-15, 2010 (4 pages).
H 3GPP TSG RAN WG2#71 R2-104444, MediaTek; Analysis in In-Device Coexistence Interference Avoidance; Madrid, Spain, Aug. 23-27, 2010 (10 pages).
International Search Report and Written Opinion of International Search Authority for PCT/CN2011/078377 dated Nov. 17, 2011 (11 pages).
International Search Report and Written Opinion of International Search Authority for PCT/CN2011/081042 dated Feb. 2, 2012 (10 pages).
International Search Report and Written Opinion of International Search Authority for PCT/CN2011/080479 dated Jan. 19, 2012 (12 pages).
USPTO, office action of related U.S. Appl. No. 13/317,524 dated Aug. 21, 2013 (17 pages).
USPTO, office action of related U.S. Appl. No. 13/136,862 dated Oct. 7, 2013 (26 pages).
JPO Office Action of JP patent application 2013-520958 dated Mar. 4, 2014 (4 pages).

(56) References Cited

OTHER PUBLICATIONS

Taiwan IPO Office Action of TW patent application 100128825 dated Mar. 21, 2014 (5 pages).
JPO Office Action of JP patent application 2013-530554 dated Apr. 1, 2014 (4 pages).
Search Report for the EP application 11795201.0 dated Dec. 18 2014 (8 pages).
EPO, Search Report for the EP application 11816122.3 dated Oct. 21, 2014 (8 pages).
"Information technology—Telecommunications and information exchange between systems—Local and Metropolitan area networks—Specific requirements—Part 11: Wireless LAN Medium Access Control (MAC) and Physical Layer (PHY) Specifications", (Jan. 1, 2003), IEEE Standard; [IEEE Standard], IEEE, Piscataway, NJ, USA, * pp. 3-8, * pp. 72-73.
EPO, Search Report for the EP application 11828151.8 dated Feb. 9, 2015 (9 pages).
R2-103644, 3GPP TSG-RAN WG2 Meeting #70bis; MediaTek; Discussion on In-Device Coexistence Interference Avoidance; Jun. 28-Jul. 2, 2010 (3 pages).
USPTO, Office Action for related U.S. Appl. No. 14/200,398 dated Apr. 7, 2015 (11 pages).
USPTO, Office Action for related U.S. Appl. No. 14/263,166 dated Apr. 30, 2015 (23 pages).

* cited by examiner (Prior Art)
FIG. 1

METHOD OF IN-DEVICE INTERFERENCE MITIGATION FOR CELLULAR, BLUETOOTH, WIFI, AND SATELLITE SYSTEMS COEXISTENCE

CROSS REFERENCE TO RELATED APPLICATIONS

This application claims priority under 35 U.S.C. §119 from U.S. Provisional Application No. 61/373,142, entitled "Method to Trigger In-Device Coexistence Interference Mitigation in Mobile Cellular Systems," filed on Aug. 12, 2010; U.S. Provisional Application No. 61/373,151, entitled "Method of In-Device Interference Mitigation for Cellular, Bluetooth, WiFi and Satellite Systems Coexistence," filed on Aug. 12, 2010; U.S. Provisional Application No. 61/374,046, entitled "Method of In-Device Interference Mitigation for Wireless Systems," filed on Aug. 16, 2010; U.S. Provisional Application No. 61/374,052, entitled "Method of In-Device Interference Avoidance for wireless Systems," filed on Aug. 16, 2010, the subject matter of which is incorporated herein by reference.

TECHNICAL FIELD

The disclosed embodiments relate generally to wireless network communications, and, more particularly, to Multi-Radio Terminals (MRT) containing Long Term Evolution (LTE) transceiver, WiFi transceiver, BT transceiver, or GNSS receiver.

BACKGROUND

Ubiquitous network access has been almost realized today. From network infrastructure point of view, different networks belong to different layers (e.g., distribution layer, cellular layer, hot spot layer, personal network layer, and fixed/wired layer) that provide different levels of coverage and connectivity to users. Because the coverage of a specific network may not be available everywhere, and because different networks may be optimized for different services, it is thus desirable that user devices support multiple radio access networks on the same device platform. As the demand for wireless communication continues to increase, wireless communication devices such as cellular telephones, personal digital assistants (PDAs), smart handheld devices, laptop computers, tablet computers, etc., are increasingly being equipped with multiple radio transceivers. A multiple radio terminal (MRT) may simultaneously include a Long-Term Evolution (LTE) or LTE-Advanced (LTE-A) radio, a Wireless Local Area Network (WLAN, e.g., WiFi) access radio, a Bluetooth (BT) radio, and a Global Navigation Satellite System (GNSS) radio.

Due to spectrum regulation, different technologies may operate in overlapping or adjacent radio spectrums. For example, LTE/LTE-A TDD mode often operates at 2.3-2.4 GHz, WiFi often operates at 2.400-2.483.5 GHz, and BT often operates at 2.402-2.480 GHz. Simultaneous operation of multiple radios co-located on the same physical device, therefore, can suffer significant degradation including significant coexistence interference between them because of the overlapping or adjacent radio spectrums. Due to physical proximity and radio power leakage, when the transmission of data for a first radio transceiver overlaps with the reception of data for a second radio transceiver in time domain, the second radio transceiver reception can suffer due to interference from the first radio transceiver transmission. Likewise, data transmission of the second radio transceiver can interfere with data reception of the first radio transceiver.

Figure 1:
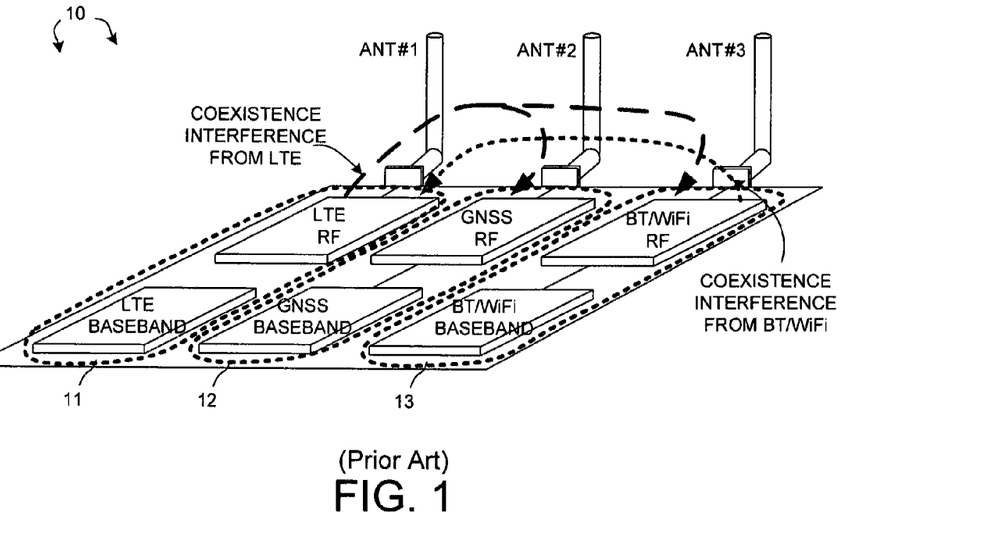
FIG. 1 (Prior Art) is a diagram that illustrates interference between an LTE transceiver and a co-located WiFi/BT transceiver and GNSS receiver.

FIG. 1 (Prior Art) is a diagram that illustrates interference between an LTE transceiver and a co-located WiFi/BT transceiver and GNSS receiver. In the example of FIG. 1, user equipment (UE) 10 is an MRT comprising an LTE transceiver 11, a GNSS receiver 12, and a BT/WiFi transceiver 13 co-located on the same device platform. LTE transceiver 11 comprises an LTE baseband module and an LTE RF module coupled to an antenna #1. GNSS receiver 12 comprises a GNSS baseband module and a GNSS RF module coupled to antenna #2. BT/WiFi transceiver 13 comprises a BT/WiFi baseband module and a BT/WiFi RF module coupled to antenna #3. When LTE transceiver 11 transmits radio signals, both GNSS receiver 12 and BT/WiFi transceiver 13 may suffer coexistence interference from LTE. Similarly, when BT/WiFi transceiver 13 transmits radio signals, both GNSS receiver 12 and LTE transceiver 11 may suffer coexistence interference from BT/WiFi. How UE10 can simultaneously communicate with multiple networks through different transceivers and avoid/reduce coexistence interference is a challenging problem.

Figure 2:
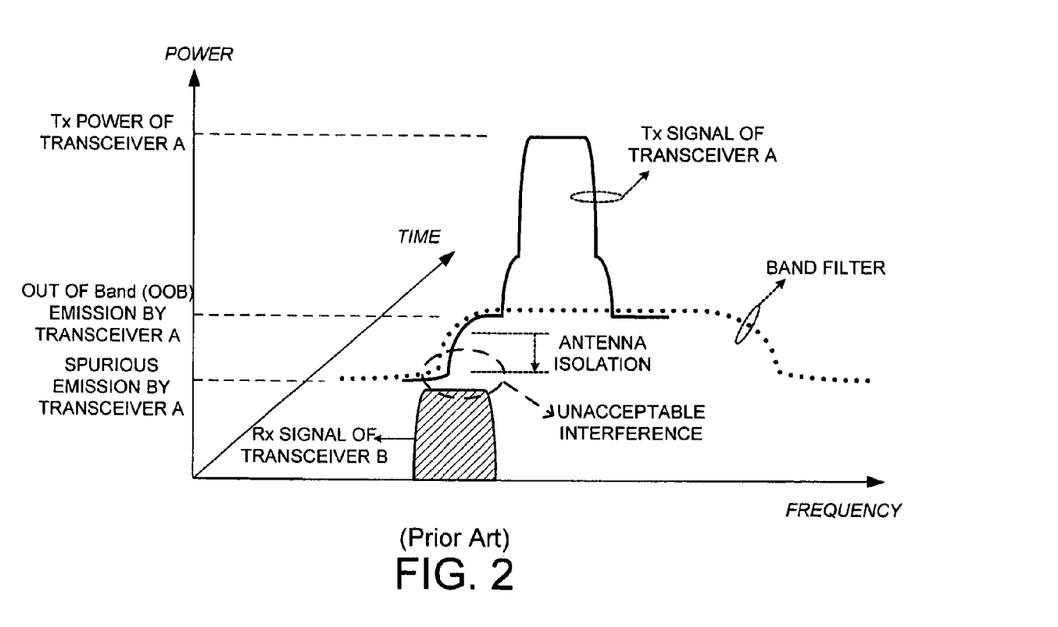
FIG. 2 (Prior Art) is a diagram that illustrates the signal power of radio signals from two co-located RF transceivers in a same device platform.

FIG. 2 (Prior Art) is a diagram that illustrates the signal power of radio signals from two co-located RF transceivers. In the example of FIG. 2, transceiver A and transceiver B are co-located in the same device platform (i.e., in-device). The transmit (TX) signal by transceiver A (e.g., WiFi TX in ISM CH1) is very close to the receive (RX) signal (e.g., LTE RX in Band 40) for transceiver B in frequency domain. The out of band (OOB) emission and spurious emission resulted by imperfect TX filter and RF design of transceiver A may be unacceptable to transceiver B. For example, the TX signal power level by transceiver A may be still higher (e.g. 60 dB higher before filtering) than RX signal power level for transceiver B even after the filtering (e.g., after 50 dB suppression).

In addition to imperfect TX filter and RF design, imperfect RX filter and RF design may also cause unacceptable in-device coexistence interference. For example, some RF components may be saturated due to transmit power from another in-device transceiver but cannot be completely filtered out, which results in low noise amplifier (LNA) saturation and cause analog to digital converter (ADC) to work incorrectly. Such problem actually exists regardless of how much the frequency separation between the TX channel and the RX channel is. This is because certain level of TX power (e.g., from a harmonic TX signal) may be coupled into the RX RF frontend and saturate its LNA. If the receiver design does not consider such coexistence interference, the LNA may not be adapted at all and keep saturated until the coexistence interference be removed (e.g. by turning off the interference source).

Various in-device coexistence (IDC) interference mitigation solutions have been proposed. Moving the ISM band signal away from the LTE licensed band is one possible IDC solution. For example, an in-device BT module may apply adaptive frequency hopping (AFH) to adjust the frequency hopping range. An in-device WiFi module may select another WiFi access point (AP) that operates in another frequency channel farther away from the LTE band. Those solutions, however, cannot work properly unless the BT module can successfully complete initial connection setup, or unless the WiFi module can successfully scan WiFi beacons from other WiFi APs. Additional solutions are sought to protect BT/WiFi connection setup or other important signaling procedures.

SUMMARY

A coexistence interference mitigation method is provided. In a wireless network, a wireless device is equipped with multiple radios in the same device platform. The wireless device also has a control entity that communicates with the multiple co-located radio modules. A first radio module receives a notification from the control entity. The notification informs a critical signaling status of a second radio module co-located with the first radio module. Upon receiving the notification, the first radio module stops uplink transmission due to coexistence interference. The first radio module does not follow uplink transmission opportunities granted by a serving eNB and transmits a coexistence indicator to the eNB. After a certain period, the first radio module receives a second notification that informs a completion status of the critical signaling of the second radio module. Upon receiving the second notification, the first radio module resumes uplink transmission and transmits a coexistence resume indicator to the eNB.

In one embodiment, the first radio module is an LTE/WiMAX radio, and the second radio module is a BT/WiFi radio. The critical signaling includes an inquiry or paging request/response signal that is transmitted or received during an initial connection setup or other important procedures by the BT/WiFi radio. Upon learning the status of the critical signaling, the LTE/WiMAX radio autonomously stops uplink transmission for a period of time until the completion of the procedure. By autonomously denying LTE uplink transmission opportunities, coexistence interference is avoided to protect the initial connection setup or other important procedures of the BT/WiFi device. Furthermore, because the eNB receives the coexistence indicator that informs the LTE denial behavior, it prevents the eNB from sending out false alarms or triggering unnecessary functions during the special time period of the LTE denial.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
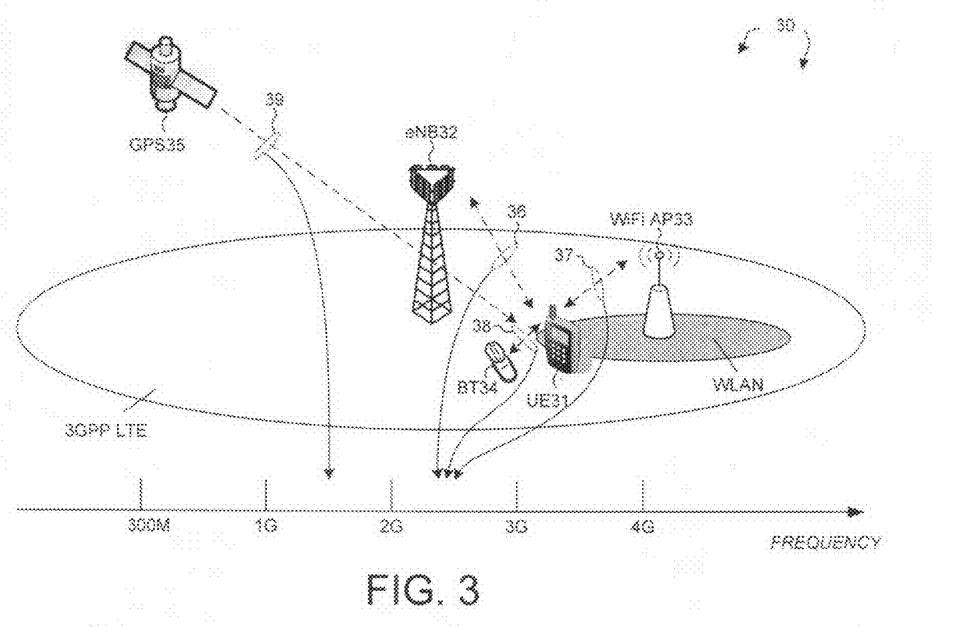
FIG. 3 illustrates a user equipment having multiple radio transceivers in a wireless communication system in accordance with one novel aspect.

FIG. 3 illustrates a user equipment UE31 having multiple radio transceivers in a wireless communication system 30 in accordance with one novel aspect. Wireless communication system 30 comprises a user equipment UE31, a serving base station (e.g., evolved node-B) eNB32, a WiFi access point WiFi AP33, a Bluetooth device BT34, and a global positioning system satellite device GPS35. Wireless communication system 30 provides various network access services for UE31 via different radio access technologies. For example, eNB32 provides OFDMA-based cellular radio network (e.g., a 3GPP Long-Term Evolution (LTE) or LTE-Advanced (LTE-A) system) access, WiFi AP33 provides local coverage in Wireless Local Area Network (WLAN) access, BT34 provides short-range personal network communication, and GPS35 provides global access as part of a Global Navigation Satellite System (GNSS). To access various radio networks, UE31 is a multi-radio terminal (MRT) that is equipped with multiple radios coexisted/co-located in the same device platform (i.e., in-device).

Due to spectrum regulation, different radio access technologies may operate in overlapping or adjacent radio spectrums. As illustrated in FIG. 3, UE31 communicates radio signal 36 with eNB32, radio signal 37 with WiFi AP33, radio signal 38 with BT34, and receives radio signal 39 from GPS35. Radio signal 36 belongs to 3GPP Band 40, radio signal 37 belongs to one of the WiFi channels, and radio signal 38 belongs to one of the seventy-nine Bluetooth channels. The frequencies of all those radio signals fall within a range from 2.3 GHz to 2.5 GHz, which may result in significant in-device coexistence (IDC) interference to each other. The problem is more severe around the 2.4 GHz ISM (The Industrial, Scientific and Medical) radio frequency band. In one novel aspect, UE31 performs autonomous LTE denial to protect BT/WiFi initial connection setup and other important signaling procedures, such that the in-device BT/WiFi radios can apply various IDC interference mitigation solutions. The UE autonomous LTE denial solution requires internal device coordination, such as a central control entity that communicates with the multiple radios within the UE.

Figure 4:
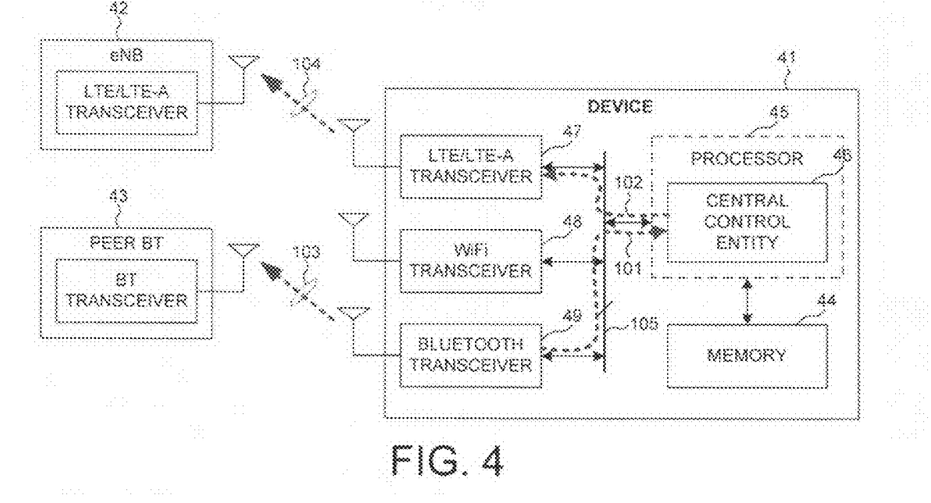
FIG. 4 is a simplified block diagram of a wireless device having a central control entity.

FIG. 4 is a simplified block diagram of a wireless device 41 having a central control entity to facilitate UE autonomous LTE denial. Wireless device 41 comprises memory 44, a processor 45 having a central control entity 46, a LTE/WiMAX transceiver 47, a WiFi transceiver 48, a Bluetooth transceiver 49, and bus 105. In the example of FIG. 8, central control entity 46 is a logical entity physically implemented within processor 45, which is also used for device application processing for device 41. Alternatively, central control entity 46 is a logical entity implemented within a processor that is physically located within the LTE/WiMAX transceiver, the WiFi transceiver, or the BT transceiver. Central control entity 46 is connected to various transceivers within device 41, and communicates with the various transceivers via bus 105. For example, BT transceiver 49 transmits BT signal information and/or BT traffic and scheduling information to central control entity 46 (e.g., depicted by a dotted line 101). Based on the received BT information, central control entity 46 determines control information and transmits the control information to LTE/WiMAX transceiver 47 (e.g., depicted by a dotted line 102). In one embodiment, BT transceiver 49 performs initial connection setup with its peer BT device 43 (e.g., depicted by a dotted line 103). LTE/WiMAX transceiver 47 learns the BT activity through control entity 46 and performs autonomous LTE denial to protect the initial connection setup procedure. LTE/WiMAX transceiver 47 further communicates with its serving base station eNB42 to indicate its absence on Tx for a period of time (e.g., depicted by a dotted line 104) to prevent eNB false alarm.

Figure 5:
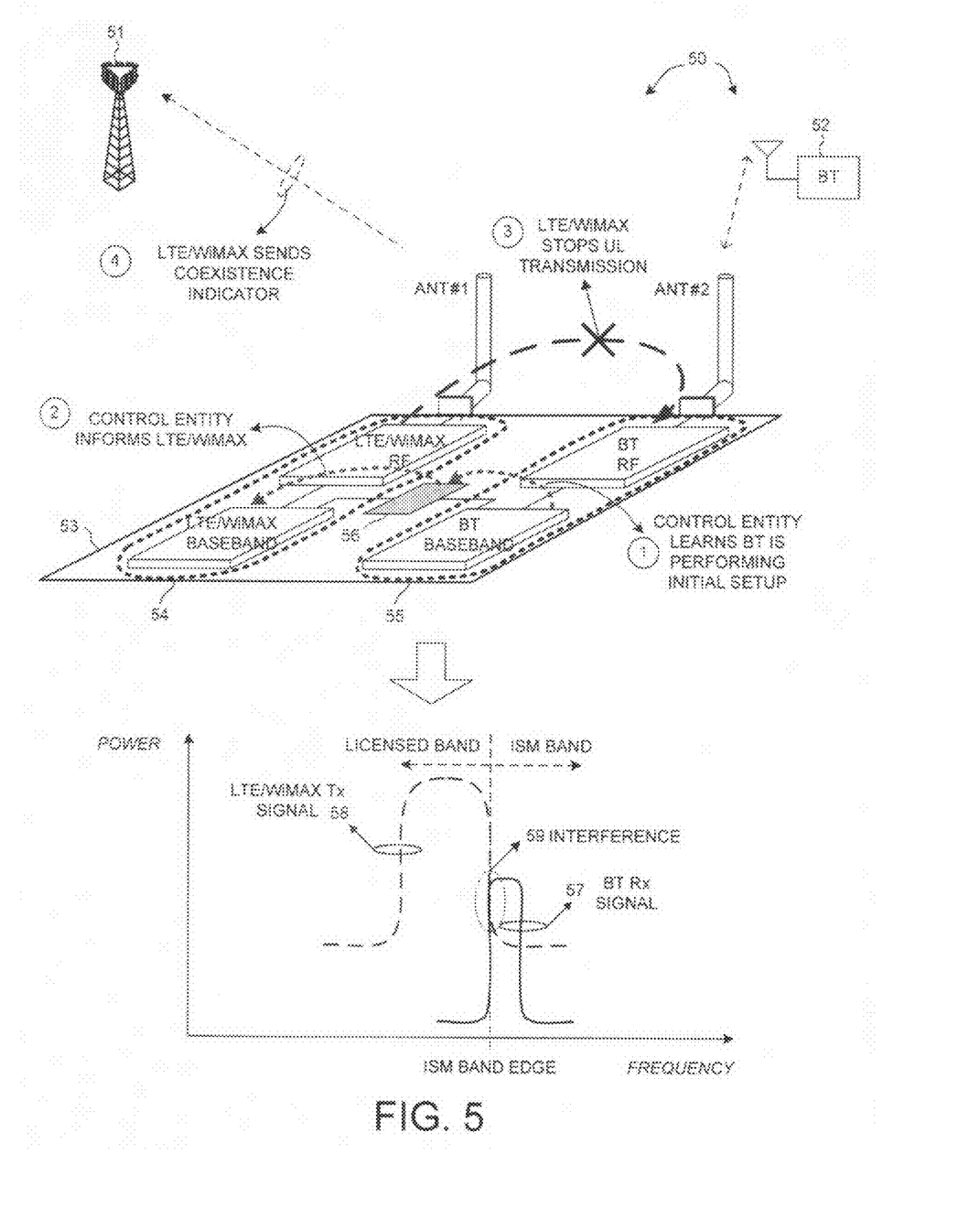
FIG. 5 illustrates one embodiment of UE autonomous solution for IDC interference avoidance in accordance with one novel aspect.

FIG. 5 illustrates one embodiment of the UE autonomous LTE denial solution for IDC interference avoidance in wireless network 50. Wireless network 50 comprises a base station eNB51, a BT device 52, and a user equipment UE53. UE53 comprises an LTE/WiMAX radio module (e.g., transceiver) 54, a BT radio module (e.g., transceiver) 55, and a control entity 56. When LTE/WiMAX signal is transmitted by the LTE/WiMAX transceiver 54 near the ISM band, the out of band emission may result in unacceptable interference level to the BT transceiver 55, which is collocated on the same device platform. During BT initial connection setup, BT radio module 55 will send/receive the inquiry or paging signals (e.g., critical signals) to its peer BT device 52. The signals will be sent through all RF channels in frequency hopping manner. The coexistence interference may result in co-located BT transceiver 55 not able to receive the inquiry/paging signals or the response from its peer BT device 52, especially when the signals are sent through RF channels close to the ISM band edge.

As illustrated in the bottom half of FIG. 5, radio signal 57 is a critical signal (e.g., inquiry or paging signal) transmitted from BT device 52 and received by BT radio module 55 for initial connection setup. Meanwhile, radio signal 58 is transmitted by LTE/WiMAX radio module 54 at a frequency location very close to the ISM band edge. It is unavoidable that BT signal will hop to the ISM band edge at initial connection setup stage. When the BT signal hops to the ISM band edge, critical BT signal 57 would be interfered by LTE/WiMAX signal 58 (as depicted by area 59), which may result in initial connection setup failure. If BT cannot complete initial connection setup, then BT cannot perform other interference avoidance mechanisms, such as further negotiation to reduce frequency hopping range for moving BT signals farther away from LTE/WiMAX signals (e.g., via existing adaptive frequency hopping (AFH) mechanism). Therefore, the entire interference avoidance mechanism cannot work unless BT can successfully complete the initial connection setup.

In one novel aspect, UE53 performs autonomous LTE denial to protect BT (or WiFi, GNSS) initial connection setup procedure or other critical signaling. To facilitate the UE autonomous LTE denial, control entity 56 equipped within UE53 can learn BT/WiFi/GNSS operation status and instruct LTE transceiver to stop transmitting signals if BT/WiFi/GNSS is performing initial connection setup procedure or other critical signaling. As illustrated in the top half to FIG. 5, first, the control entity learns that the BT radio module is going to perform initial connection setup (e.g., inquiry or paging procedure) (step 1). The control entity then informs such information to the LTE/WiMAX radio module and instructs LTE/WiMAX not to transmit signal for a period of time (step 2). Based on the instruction from the control entity, the LTE/WiMAX radio module no longer follows uplink transmission opportunities granted by eNB51 and stops uplink transmission for a period of time (e.g., UE autonomous denial of LTE transmission opportunity) (step 3). Finally, the LTE/WiMAX radio module also transmits a coexistence indicator to eNB51 to inform eNB51 that the UE will intentionally skip uplink transmission to prevent eNB51 from sending false alarms (e.g., HARQ failure) (step 4). Referring back to the bottom half of FIG. 5, BT Rx signal 57 will not be interfered by LTE/WiMAX Tx signal 58 because of the LTE denial mechanism (e.g., signal 58 is depicted by a dashed line). As a result, coexistence interference from LTE/WiMAX will be avoided for a period of time to help BT complete the initial connection setup.

Figure 6:
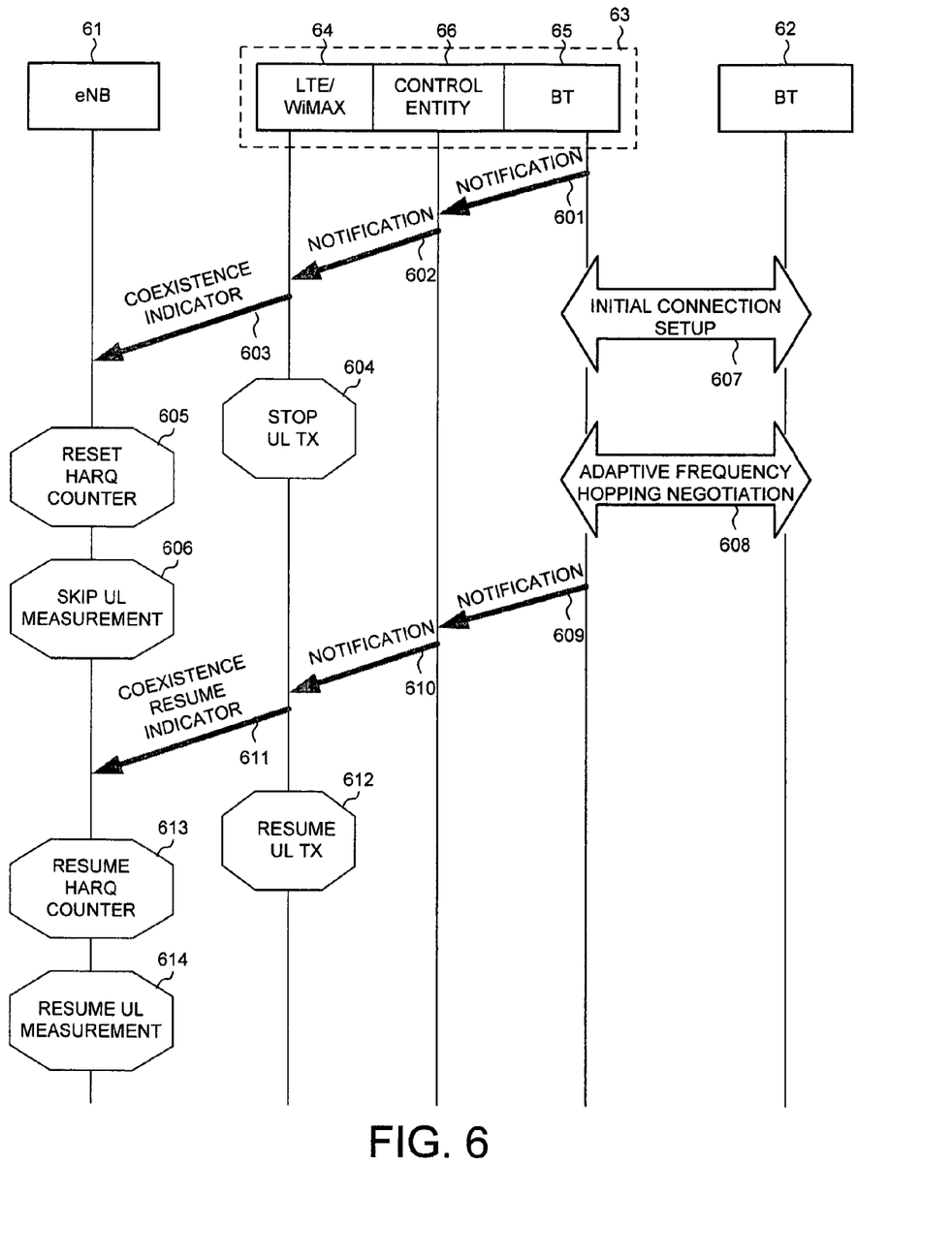
FIG. 6 illustrates a detailed process flow of UE autonomous LTE denial for IDC interference avoidance.

FIG. 6 illustrates a more detailed process flow of the UE autonomous LTE denial solution for IDC interference avoidance in wireless network 60. Wireless network 60 comprises an eNB61, a BT device 62, and a UE63. UE63 is a multi-radio terminal comprising an LTE/WiMAX radio 64, a BT radio 65, and a control entity 66. In step 601, BT radio 65 notifies its status on initial connection setup or other important procedures to control entity 66. In step 602, control entity 66 forwards the notification to LTE/WiMAX radio 64. Control entity 66 may also instruct LTE/WiMAX radio 64 not to transmit signals for a period of time. Based on the received notification or instruction, UE63 stops uplink transmission and skips uplink transmission opportunities granted by eNB61 (step 604). Optionally, UE63 also sends a coexistence indicator to eNB61 in step 603. The coexistence indicator informs eNB61 that UE63 is going to skip uplink transmission for a period of time due to coexistence interference. In response to the coexistence indicator, eNB61 configures certain uplink measurement functions into abnormal status. Uplink measurement functions may include HARQ function and uplink signal quality measurement function. For example, eNB61 freezes or resets the HARQ retransmission counter or other related counters (step 605). In another example, eNB61 skips uplink signal quality measurement result transmitted from UE63, and does not trigger other functions (e.g., coexistence interference mitigation solutions) based on the uplink signal quality measurement result (step 606). Configuring those uplink measurement functions into abnormal status prevents eNB61 from sending out false alarms or triggering unnecessary functions during the special time period of LTE denial by UE63.

For BT radio 65, it starts an initial connection setup procedure with its peer BT device 62 in step 607 after sending out the notification in step 601. During the initial connection setup, BT device 62 may sends out inquiry or paging signals while BT radio 65 may respond to the inquiry or paging signals. After successfully complete the initial connection setup, BT65 and BT62 may continue to perform adaptive frequency hopping (AFH) negotiation in step 608. During the AFH procedure, the peer BT devices further negotiate with each other to reduce frequency-hopping range such that BT signals are moved farther away from LTE/WiMAX signals to avoid coexistence interference. By having such protection from LTE/WiMAX side, existing BT initial connection setup and the AFH procedure can be directly reused without modification to perform IDC interference avoidance from BT side.

After the completion of the initial connection setup and the AFH procedure, BT radio 65 notifies its completion status on the initial connection setup or other important procedures to control entity 66 (step 609). In step 610, control entity 66 forwards the notification to LTE/WiMAX radio 64. Based on received notification, UE63 resumes uplink transmission in step 612. Optionally, UE63 also sends a coexistence resume indicator to eNB61 in step 611. The coexistence resume indicator informs eNB61 that UE63 is going to resume normal uplink transmission. In response to the coexistence resume indicator, eNB61 configures certain uplink measurement functions back to normal status. For example, eNB61 resumes HARQ retransmission counter or other related counters in step 613. In another example, eNB61 resumes uplink signal quality measurement function in step 614. After resuming uplink signal quality measurement function, eNB 61 can trigger interference mitigation mechanism based on uplink signal measurement result reported from UE 63.

Figure 7:
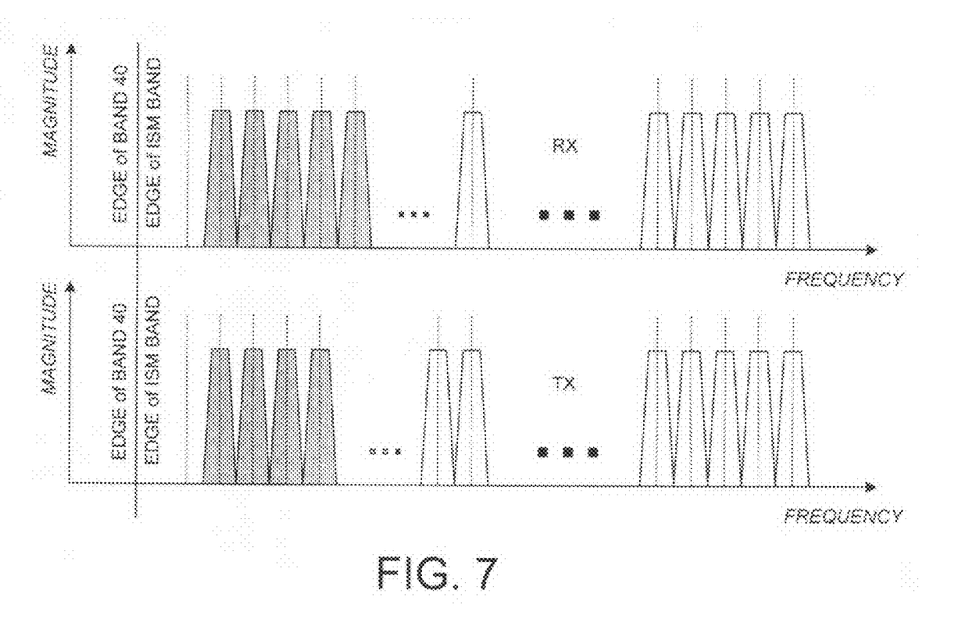
FIG. 7 illustrates adaptive frequency hopping after BT initial connection setup.

FIG. 7 illustrates an example of adaptive frequency hopping after BT initial connection setup. When in connection mode, interference experienced by the BT receiver originating from other in-device wireless technologies will cause a throughput reduction or link failure. To mitigate such IDC interference, the BT device can create a greater guard band between the BT radio and other in-device wireless radios via adaptive frequency hopping (AFH) procedure. In general, if a BT device experiences stronger interference, then more frequency channels are restricted or excluded from data transmission. On the other hand, if weaker interference is experienced, then less frequency channels are restricted or excluded from data transmission.

To meet the current Bluetooth specification, the frequency hopping set must have the same bandwidth for both Tx and Rx. Therefore, the frequency hopping bandwidth reduction due to IDC interference would have account for the worse case interference mechanism for either Tx or Rx. However, because coexistence interference may very likely be different between Tx and Rx, it would be beneficial if the frequency hopping bandwidth for Tx and Rx could be set to different values to maximize diversity gain. As illustrated in FIG. 7, in one novel aspect, if the in-device BT receiver experiences stronger interference, then more frequency channels are excluded from the hopping range for Rx. On the other hand, if the in-device BT transmitter introduces weaker interference to other in-device wireless radios, then less frequency channels are excluded from the hopping range for Tx.

To implement the AFH procedure, channel classification may be used as an indication to the BT device to exclude frequency channels that are close to those used by other in-device wireless radios. For example, setting the channel classification to "bad" for a specific channel is a useful indication to the master Bluetooth device that this specific channel should be excluded from the AFH list. In addition, a new channel classification may be created to indicate IDC interference. For example, a channel classification called "ugly" may be created to indicate that a specific channel has unacceptable IDC interference. Based on this information, this specific channel should be removed from the AFH list to mitigate IDC interference.

Figure 8:
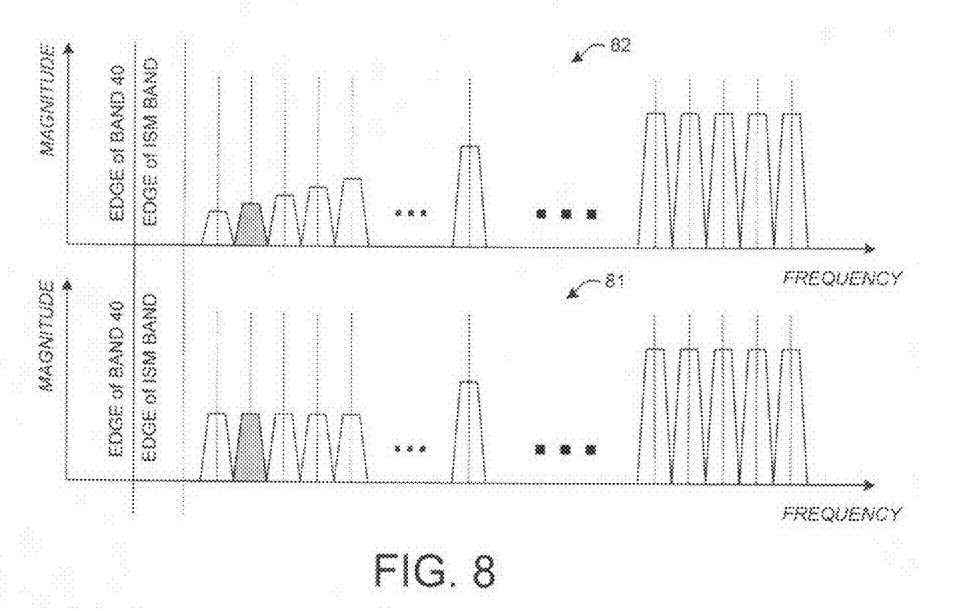
FIG. 8 illustrates power management solution after BT initial connection setup.

FIG. 8 illustrates a power management solution for IDC interference mitigation after BT initial connection setup. In addition to applying the AFH procedure, a BT device may also perform power control methods to further mitigate IDC interference. In general, if a BT device introduces interference to other in-device radios, then the solution is to reduce the power level of the BT transmitter on frequencies near the in-device receiver. The power level reduction can be based on a scaling factor that is dependent on several factors. First, the scaling factor is dependent on the frequency distance between the in-device radios. Second, the scaling factor is dependent on the number of transmission failures. Third, the scaling factor is dependent on interference measurement result communicated between the in-device radios. As illustrated in FIG. 8, for frequency channels closer to the edge of the ISM band, the power level is reduced more. On the other hand, the power level reduction becomes less as the frequency location moves farther away from the ISM band edge. In addition, the power level can be reduced either as a flat reduction (depicted by chart 81) or as a slope (depicted by chart 82) over a specified frequency range. The frequency range and slope of the power reduction could be determined by either parameters inherent in the design of the UE or dynamic interference measurements shared by the in-device radios.

Figure 9:
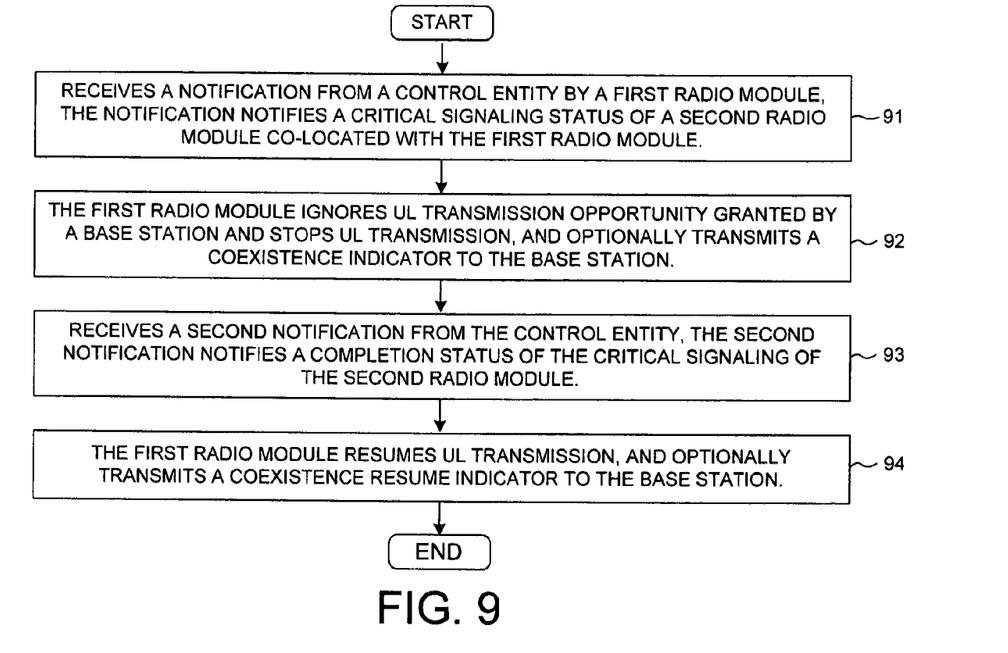
FIG. 9 is a flow chart of a method of autonomous LTE denial for IDC interference avoidance from UE perspective in accordance with one novel aspect.

FIG. 9 is a flow chart of a method of UE autonomous denial of LTE transmission opportunity for IDC interference avoidance from UE perspective in accordance with one novel aspect. In a wireless network, a wireless device is a multi-ratio terminal that is equipped with multiple radios in the same device platform. The wireless device also has a control entity that communicates and coordinates with the multiple radio modules. A first radio module receives (step 91) a notification from the control entity. The notification informs a critical signaling status of a second radio module co-located with the first radio module. For example, the critical signaling may be an inquiry or paging signaling message transmitted during an initial connection setup procedure. Upon receiving the notification, the first radio module stops (step 92) uplink transmission for a period of time, and does not follow any uplink transmission opportunity granted by it serving base station. Optionally, the first radio module transmits a coexistence indicator to the eNB. After the second radio module completes its initial connection setup or other important procedure, the first radio module receives (step 93) a second notification. The second notification informs a completion status of the critical signaling of the second radio module. Upon receiving the second notification, the first radio module resumes (step 94) uplink transmission. Optionally, the first radio module transmits a coexistence resume indicator to the eNB.

Figure 10:
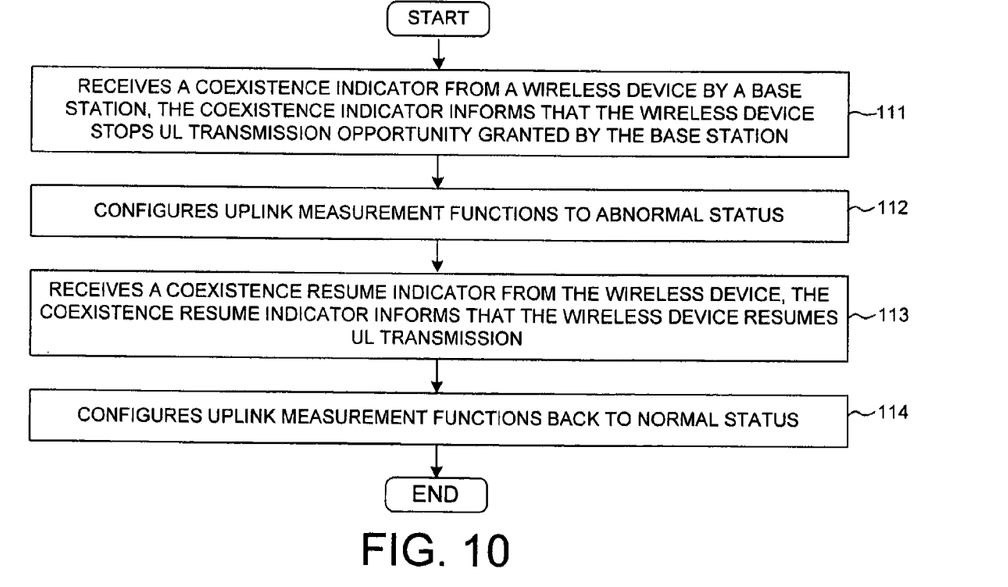
FIG. 10 is a flow chart of a method of autonomous LTE denial for IDC interference avoidance from eNB perspective in accordance with one novel aspect.

FIG. 10 is a flow chart of a method of UE autonomous denial of LTE transmission opportunity for IDC interference avoidance from eNB perspective in accordance with one novel aspect. In a wireless network, a wireless device is a multi-ratio terminal that is equipped with an LTE/WiMAX radio and other ISM band radios in the same device platform. The wireless device is served by a base station (eNB) for cellular radio network access. The serving base station receives (step 111) a coexistence indicator from an LTE/WiMAX radio module of the wireless device. The coexistence indicator informs the base station that the wireless device will stop uplink LTE/WiMAX transmission and ignore uplink transmission opportunity granted by the base station due to coexistence interference from the ISM band radios. In response to the coexistence indicator, the base station configures (step 112) uplink measurement functions into abnormal status. For example, the base station may freeze or reset HARQ retransmission counter or stop UL MDT (Minimization of Driving Test) logging. The base station may also skip uplink signal quality measurement results and stop triggering other functions based on the measurement results.

Later on, the base station receives (step 113) a coexistence resume indicator from the LTE/WiMAX radio module of the wireless device. The coexistence resume indicator informs the base station that the wireless device will resume uplink LTE/WiMAX transmission. In response to the coexistence resume indicator, the base station configures (step 114) the uplink measurement functions back to normal status. For example, the base station resumes the HARQ retransmission counter and resumes triggering other interference mitigation functions based on the uplink signal quality measurement results.

In one alternative embodiment, the UE does not transmit the coexistence resume indicator, and the base station does not receive the coexistence resume indicator. Instead, the base station simply configures the uplink measurement functions back to normal status after a specific time delay. The specific time delay may be contained in the coexistence indicator transmitted from the UE. The specific time delay may be a predefined value of estimation. For example, if the initial BT connection setup procedure typically requires approximately 500 ms, then the base station assumes that the UE stops uplink transmission for about 500 ms to protect the initial BT connection setup from coexistence interference. After the base station receives the coexistence indicator, the base station will configure the uplink measurement functions back to normal status after 500 ms without receiving the coexistence resume indicator.

Although the present invention has been described in connection with certain specific embodiments for instructional purposes, the present invention is not limited thereto. For example, although an LTE/LTE-A or WiMAX mobile communication system is exemplified to describe the present invention, the present invention can be similarly applied to other mobile communication systems, such as Time Division Synchronous Code Division Multiple Access (TD-SCDMA) systems. Accordingly, various modifications, adaptations, and combinations of various features of the described embodiments can be practiced without departing from the scope of the invention as set forth in the claims.

What is claimed is:

1. A method comprising:
   (a) receiving a notification from a processor by a first transceiver, wherein the processor notifies a critical signaling status of a second transceiver co-located with the first transceiver;
   (b) stopping an ongoing uplink transmission with a base station for a period of time by the first transceiver and ignoring uplink transmission opportunity granted to the first transceiver by the base station in response to the notification of the critical signaling status of the second transceiver; and
   (c) transmitting a coexistence indicator from the first transceiver to the base station to prevent the base station from sending a false alarm and from triggering additional coexistence interference mitigation functions for the first transceiver during the period of time.

2. The method of claim 1, wherein the coexistence indicator is transmitted via a radio resource control (RRC) signaling message or a media access control (MAC) control element (CE).

3. The method of claim 1, further comprising:
   receiving a second notification from the control entity, wherein the control entity notifies a completion status of the critical signaling of the second transceiver; and
   resuming uplink transmission.

4. The method of claim 3, further comprising: transmitting a coexistence resume indicator from the first transceiver to the base station.

5. The method of claim 1, wherein the second transceiver is a Bluetooth module, and wherein the critical signaling is part of an initial connection setup procedure.

6. The method of claim 1, wherein the second transceiver is a Bluetooth transceiver, and wherein the critical signaling is part of an adaptive frequency hopping (AFH) setup procedure.

7. The method of claim 1, wherein the second transceiver adjusts a transmit power level based on a frequency distance from a frequency channel of the second transceiver to a frequency channel of the first transceiver.

8. The method of claim 1, wherein the second transceiver adjusts a transmit power level based on a number of transmission failures.

9. A method comprising:
   (a) receiving a coexistence indicator from a wireless device by a base station, wherein the coexistence indicator informs that the wireless device ignores uplink transmission opportunity granted by the base station and stops uplink transmission for a period of time;
   (b) configuring uplink measurement functions into abnormal status in response to the coexistence indicator, wherein the base station refrains from sending alarms and triggering additional coexistence interference mitigation functions for the wireless device during the period of time; and
   (c) receiving a coexistence resume indicator from the wireless device, wherein the base station configures the uplink measurement functions back to normal status.

10. The method of claim 9, wherein the uplink measurement functions include hybrid automatic repeat request (HARQ) function, and wherein the base station stops or resets an HARQ retransmission counter in (b).

11. The method of claim 9, wherein the uplink measurement functions include uplink signal measurement function, and wherein the base station ignores uplink measurement results in (b).

12. The method of claim 9, wherein the uplink measurement functions include minimization of driving test (MDT) function, and wherein the base station stops logging uplink measurement results for MDT in (b).

13. The method of claim 9, wherein the coexistence indicator is received via a radio resource control (RRC) signaling message or a media access control (MAC) control element (CE).

14. A wireless device, comprising: a first transceiver; a second transceiver that is co-located with the first transceiver; and a processor that sends a notification to the first transceiver, wherein the notification notifies the first transceiver a critical signaling status of the second transceiver, wherein the first transceiver ignores uplink transmission opportunity granted to the first transceiver by a base station and stops an ongoing uplink transmission with the base station in response to the notification of the critical signaling status of the second transceiver, and wherein the first transceiver transmitting a coexistence indicator to the base station to prevent the base station from sending a false alarm and from triggering additional coexistence interference mitigation functions for the first transceiver during the period of time.

15. The device of claim 14, wherein the coexistence indicator is transmitted via a radio resource control (RRC) signaling message or a media access control (MAC) control element (CE).

16. The device of claim 14, wherein the processor sends a second notification to the first transceiver notifying a completion status of the critical signaling of the second transceiver, and wherein the first transceiver resumes uplink transmission in response to the second notification.

17. The device of claim 16, wherein the first transceiver transmits a coexistence resume indicator to the base station.

18. The device of claim 14, wherein the second transceiver is a Bluetooth module, and wherein the critical signaling is part of an initial connection setup procedure.

19. The device of claim 14, wherein the second transceiver is a Bluetooth transceiver, and wherein the critical signaling is part of an adaptive frequency hopping (AFH) signaling procedure.

20. The device of claim 14, wherein the second transceiver adjusts a transmit power level based on a frequency distance from a frequency channel of the second transceiver to a frequency channel of the first transceiver.

21. The device of claim 14, wherein the second transceiver adjusts a transmit power level based on a number of transmission failures.

* * * * *